Patented Feb. 18, 1930

1,747,541

UNITED STATES PATENT OFFICE

BRUNO FRANCKE AND HANS MOEHRKE, OF HOCHST-ON-THE-MAIN, GERMANY, ASSIGNORS TO GENERAL ANILINE WORKS, INC., OF NEW YORK, N. Y., A CORPORATION OF DELAWARE

WATER-SOLUBLE DYESTUFFS OF THE TRIARYLMETHANE SERIES AND PROCESS OF PREPARING THE SAME

No Drawing. Application filed December 31, 1926, Serial No. 158,402, and in Germany January 2, 1926.

Our present invention relates to a process of preparing water-soluble dyestuffs of the tri-aryl-methane series capable of being chromed.

We have found that the dyestuffs of the triaryl-methane series of the general formula:

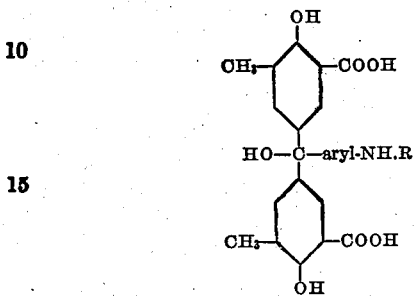

wherein R stands for hydrogen or for an alkyl or aryl group, which groups may be substituted, and the R.NH-group is in para-position to the carbinol, can be converted into water-soluble compounds by treating them with neutral sulfites. The compounds thus obtained can be evaporated without being decomposed. They are, when acidified, re-transformed into the primary water-insoluble dyestuffs.

The solubility of the new dyestuffs in water offers a great technical advance, because it considerably facilitates their application for dyeing purposes, and it is only due to this property that they can be used at all for printing purposes.

The following examples serve to illustrate our invention, but they are not intended to limit it thereto, all parts being by weight:

(1) 51 parts of para-phenyl-para-tolylamine-di-ortho-cresotinic acid-carbinol of the probable formula:

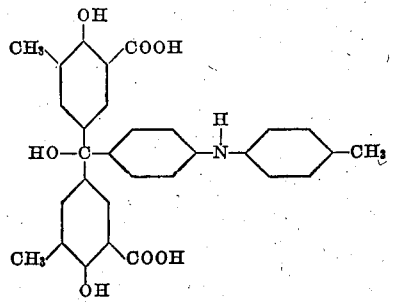

(see the example of German patent specification No. 238.552) are heated, while stirring, with 55 parts of crystallized sodium sulfite and about 1000 parts of water, until the dyestuff is dissolved. The product thus obtained is separated by filtration from any impurities which may be present and evaporated to dryness. The evaporated colorless product readily dissolves in water; by acidifying it, the original carbinol is re-precipitated. The afterchromed dyeing of the sulfite compound is violet and has the same properties as the primary dyestuff.

(2) 55 parts of para-phenyl-para-6-chloro-2-toluidine-di-ortho-cresotinic acid-carbinol of the probable formula:

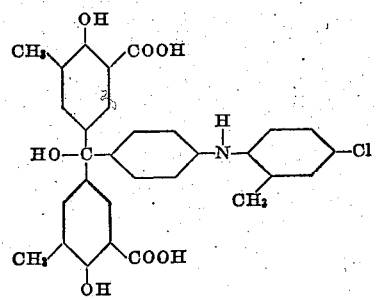

are heated, while stirring, with 55 parts of crystallized sodium sulfite and about 1000 parts of water until the dyestuff is dissolved; the mass is then filtered and evaporated to dryness. The evaporated colorless product, like that described in Example 1, readily dissolves in water and by acidifying it the primary carbinol is re-precipitated. The after-chromed dyeing of the sulfite compound is violet and has the same properties as the original dyestuff.

(3) 61 parts of the dyestuff, of the probable formula:

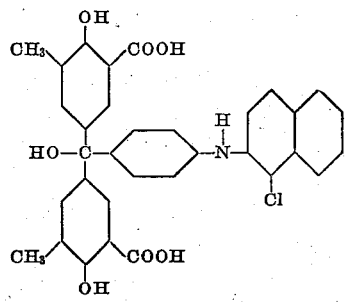

prepared from 2 molecules of ortho-cresotinic acid and para-chlorbenzaldehyde treated with 1-chloro-2-naphthylamine, are heated, while stirring, with 55 g. of crystallized sodium sulfite and about 1000 parts of water until the dyestuff is dissolved; the mass is then filtered and evaporated to dryness. The sulfite compound thus obtained behaves entirely like the compounds described in Examples 1 and 2.

(4) 50 parts of the dyestuff, of the probable formula:

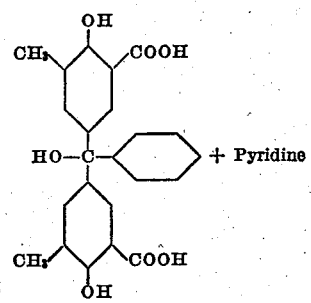

prepared by treating 2 molecules of ortho-cresotinic acid and para-chlorbenzaldehyde with pyridine, are heated, while stirring, with 55 parts of crystallized sodium sulfite and about 1000 parts of water until the dyestuff is dissolved; the mass is then filtered and evaporated to dryness. The properties and the behaviour of the compound thus obtained are also analogous to those described in the preceding examples. The dyeing obtainable by the dyestuff is greenish-blue.

We claim:

1. The process of preparing water-soluble dyestuffs of the triarylmethane series capable of being chromed which consists in treating a compound of the general formula:

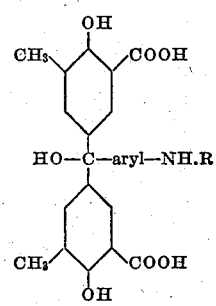

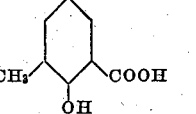

wherein R stands for hydrogen or for an alkyl or aryl group, which groups may be substituted, the R.NH-group standing in para-position to the carbinol, with a neutral sulfite.

2. The process of preparing water-soluble dyestuffs of the triarylmethane series capable of being chromed which consists in treating 1 mol of a compound of the general formula:

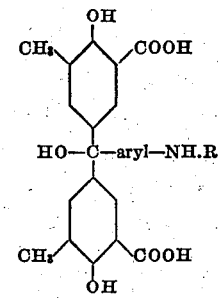

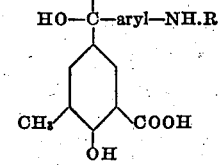

wherein R stands for hydrogen or for an alkyl or aryl group, which groups may be substituted, the R.NH-group standing in para-position to the carbinol, with 2 mols of crystallized sodium sulfite in the presence of water.

3. The process of preparing water-soluble dyestuffs of the triarylmethane series capable of being chromed which consists in treating a compound of the general formula:

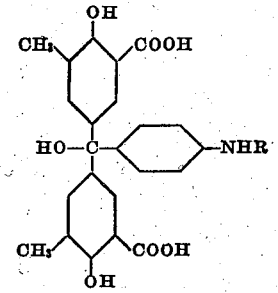

wherein R stands for hydrogen or alkyl or aryl which groups may be substituted with a neutral sulfite.

4. The process of preparing water-soluble dyestuffs of the triarylmethane series capable of being chromed which consists in treating 1 mol of a compound of the general formula:

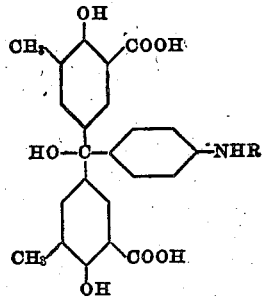

wherein R stands for hydrogen or alkyl or aryl which groups may be substituted, with 2 mols of crystallized sodium sulfite in the presence of water.

5. The process of preparing water-soluble dyestuffs of the triarylmethane series capable of being chromed which consists in treating a compound of the general formula:

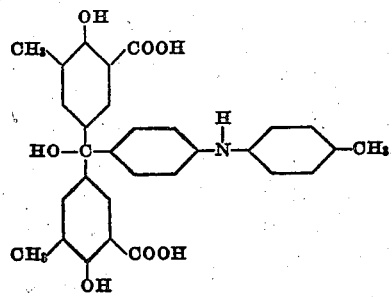

with a neutral sulfite.

6. The process of preparing water-soluble dyestuffs of the triarylmethane series capable of being chromed which consists in treating 1 mol of a compound of the formula:

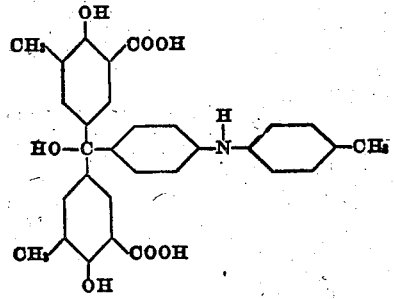

with 2 mols of crystallized sodium sulfite in the presence of water.

7. As new products, compounds obtainable by treating a compound of the general formula:

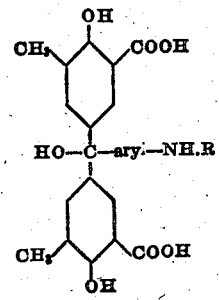

wherein R stands for hydrogen or for an alkyl or aryl group, which groups may be substituted, the R.NH-group standing in para-position to the carbinol, with a neutral sulfite, being soluble in water and not decomposing when evaporated.

8. As new products, compounds obtainable by treating a compound of the following constitution:

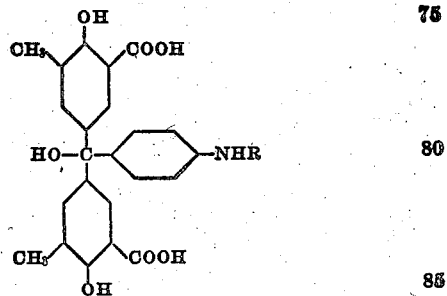

wherein R stands for hydrogen or alkyl or aryl which groups may be substituted, with neutral sulfites, being soluble in water and not decomposing when evaporated.

9. As a new product, a compound obtainable by treating the para-phenyl-para-tolylamine-di-ortho-cresotinic acid-carbinol of the constitution:

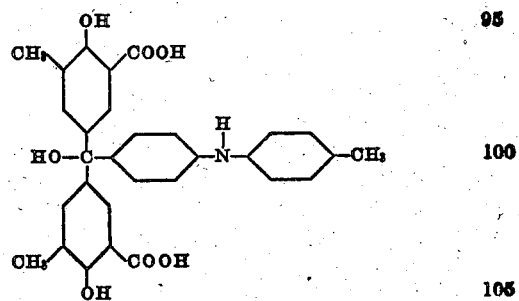

in the presence of water with 2 mols of crystallized sodium sulfite, being colorless, easily soluble in water and capable of being retransformed by acidification into the carbinol used as starting material.

In testimony whereof, we affix our signatures.

BRUNO FRANCKE.
HANS MOEHRKE.